United States Patent Office 3,149,123
Patented Sept. 15, 1964

3,149,123
1,3-DIALKYL-3-OXYPHENYLPYRROLIDINE
COMPOUNDS
John Frederick Cavalla, Isleworth, England, assignor to Parke, Davis & Company, Detroit, Mich., a corporation of Michigan
No Drawing. Filed May 28, 1962, Ser. No. 197,935
Claims priority, application Great Britain Jan. 4, 1961
14 Claims. (Cl. 260—326.3)

This invention relates to novel substituted pyrrolidine compounds and to acid addition salts thereof. More particularly, the invention relates to pyrrolidine compounds which in their free base form have the formula,

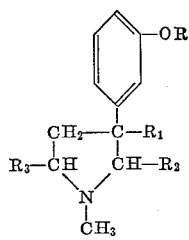

where R represents hydrogen, lower alkyl or lower alkanoyl, $R_1$ represents an alkyl radical containing from 2 to 4 carbon atoms inclusive, and $R_2$ and $R_3$ each represent hydrogen or alkyl radicals containing 1 or 2 carbon atoms, said $R_2$ being hydrogen when $R_3$ is an alkyl radical and said $R_3$ being hydrogen when $R_2$ is an alkyl radical. The preferred compounds of the invention from the standpoint of pharmacological activity coupled with ease of manufacture are those wherein R is hydrogen, methyl or acetyl, $R_1$ is n-propyl and $R_2$ and $R_3$ are both hydrogen.

The free bases of the pyrrolidine compounds having the formula given above react with a variety of organic and inorganic acids to produce acid addition salts. The salt formation is suitably carried out by reacting the free base of the pyrrolidine compound with an acid in a non-reactive solvent. The acid-addition salts can be converted to the free bases by reaction with alkaline reagents such as sodium carbonate, sodium hydroxide and potassium carbonate. Some examples of the pharmaceutically acceptable pyrrolidine acid addition salts of the invention which can be used for medicinal purposes are the hydrochloride, hydrobromide, hydroiodide, sulfate, citrate, acetate, tartrate, benzoate, sulfamate, maleate, malate, gluconate, ascorbate, and toluene sulfonate. The free bases and acid addition salts can exist in asymmetric forms. From a practical standpoint the racemic optical form is usually employed, although in general the levo optical isomer possesses a greater degree of activity than the corresponding dextro optical isomer or the racemate. It is to be understood that the invention extends to the separate optical isomers as well as to the racemic or unresolved substances.

The compounds of the invention possess useful analgetic activity and have the ability to relieve severe pain without producing the multiple side effects of alkaloidal analgetics. In comparison to alkaloidal substances such as morphine and codeine they are non-addicting. They can be administered by either the oral or parenteral route. The acid addition salts are preferred where greater water solubility is desired.

The pyrrolidine compounds of the above formula wherein R is hydrogen or lower alkyl and $R_2$ and $R_3$ are both hydrogen can be prepared by reducing a succinimide compound of formula,

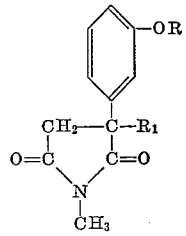

with a complex metal hydride such as lithium aluminum hydride; where R and $R_1$ have the same significance as defined above. The reduction is carried out by reacting the succinimide with the complex metal hydride in an inert anhydrous solvent such as ether, tetrahydrofuran, dioxane, or the like, followed by decomposing the product with water or an acidic or basic aqueous medium. The concentration of the hydride can be varied considerably. For best results, at least one and preferably from three to six, equivalents of the complex metal hydride are employed. The temperature of the reaction is likewise subject to considerable variation. Conveniently, the reaction is carried out at a temperature in the range from 0° C. to the boiling point of the solvent employed. When the reduction is carried out on a succinimide compound wherein R is an alkanoyl group, the alkanoyl group is removed and the pyrrolidine compound obtained is one in which R is hydrogen.

The succinimides employed as starting materials in the above procedure can be prepared as follows: A m-alkoxyphenylalkylketone is condensed with ethyl cyanoacetate to form an alkylidene derivative which is reacted with potassium cyanide to yield a dicyano ester compound. This dicyano ester is then hydrolyzed with aqueous acid to yield a tricarboxylic acid which is decarboxylated by heating to form an α-(m-alkoxyphenyl)-α-alkylsuccinic acid. The substituted succinic acid is then treated with methyl amine under conditions whereby ring closure takes place to give an N-methyl-α-(m-alkoxyphenyl)-α-alkylsuccinimide. The latter compound is converted by hydrolytic cleavage of the alkyl ether to an N-methyl-α-(m-hydroxyphenyl)-α-alkylsuccinimide which, upon acylation with a reactive derivative of a lower alkanoic acid yields an N-methyl-α-(m-alkanoyloxyphenyl)-α-alkylsuccinimide.

The compounds of the invention wherein R is hydrogen can be prepared by heating 1-methyl-3-(m-alkoxyphenyl)-3-alkyl-pyrrolidines with an acidic reagent capable of cleaving the 3-m-alkoxy ether linkage. The preferred reagent is constant boiling hydrobromic acid although other acidic reagents such as aluminum chloride in nitrobenzene can also be used. When constant boiling hydrobromic acid is used as the cleavage reagent, the reaction is carried out at the reflux temperature of the mixture for from about 1 to 8 hours. In this case the hydrobromic acid also serves as solvent for the reaction.

The compounds wherein R is alkanoyl can be prepared by reacting the corresponding 1-methyl-3-(m-hydroxyphenyl)-3-alkyl pyrrolidine with a lower alkanoic acid or a reactive derivative thereof to produce alkyl substituted 1-methyl-3-(m-alkanoyloxyphenyl)-pyrrolidines. Some examples of useful acylating agents are acetic anhydride, acetyl chloride, propionyl chloride, propionic anhydride, and butyryl bromide. For best results at least one equivalent and preferably an excess of the acylating agent is employed for each equivalent of the hydroxy compound. Typically, the acylating agent serves as solvent for the reaction although inert solvents such as ether, benzene, and the like may also be employed. If desired, acylation of the hydroxy compounds can be carried out in the presence of a base such as triethylamine or pyridine. Conveniently, the acylation is carried out at a temperature in the range of from 0 to 120° C. However, the temperature of the reaction is not particularly critical and temperatures both above and below those set forth are acceptable.

The compounds of the invention can also be prepared by reacting a pyrrolidine of the formula,

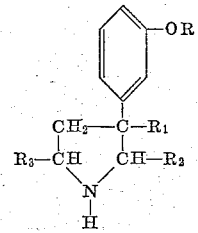

where R, $R_1$, $R_2$ and $R_3$ have the same significance as defined earlier, with an N-methylating agent. This alkylation can be carried out using any of the known methylating agents such as, for example, methyl halides or sulfates. The reaction is conveniently carried out by contacting the reactants in the presence of an organic solvent. Among the various solvents suitable for the purpose may be mentioned hydrocarbons such as benzene, toluene, xylene, and the like; lower boiling alcohols such as methanol, isopropanol, and the like; lower boiling ketones such as acetone, methyl ethyl ketone, and the like, as well as dimethylformamide and similar solvents. The relative proportions of the reactants may be varied widely but it is preferred to employ a slight excess of the methylating agent. The temperature of the reaction is not particularly critical. Temperatures in excess of 15° and up to 175° C. are preferred. Conveniently, the reaction is carried out at the reflux temperature of the reaction mixture. The N-methyl group can also be introduced by reacting the above N-unsubstituted compounds with formaldehyde-formic acid mixtures. When the formaldehyde-formic acid procedure is used the temperature is preferably controlled between 70–125° C. The formaldehyde-formic acid mixture serves as solvent for this reaction.

The N-unsubstituted pyrrolidines employed as starting materials in the above procedure can be produced in a number of ways. For example: (a) When an α-(m-alkoxyphenyl)-α-alkylacetonitrile is reacted with ethylene oxide, followed by reduction of the resulting hydroxynitrile with lithium aluminum hydride, a hydroxyamine results which is then cyclized by treatment first with thionyl chloride and then with sodium carbonate to give a 3-(m-alkoxyphenyl)-3-alkylpyrrolidine. If 1,2-propylene oxide is used in the above reaction sequence in place of ethylene oxide the resulting product is the corresponding 5-methyl-3-(m-alkoxyphenyl)-3-alkylpyrrolidine. (b) Another method for the production of the N-unsubstituted pyrrolidines used as starting materials involves treatment of an α-(m-alkoxyphenyl)-α-alkylacetonitrile with 1,2-dichloroethylene and reductive ring closure of the resulting chloronitrile with lithium aluminum hydride to give a 3-(m-alkoxyphenyl)-3-alkylpyrrolidine. (c) In another procedure, treatment of an α-(m-alkoxyphenyl)-α-alkylsuccinic acid with benzylamine followed by reduction of the succinimide derivative thereby obtained with lithium aluminum hydride gives an N-benzylpyrrolidine which, upon catalytic hydrogenolysis of the benzyl group, yields a 3-(m-alkoxyphenyl)-3-alkylpyrrolidine. (d) The alkyl substituted 3-(m-alkoxyphenyl)-pyrrolidines described in the foregoing procedures can be converted to the (m-hydroxyphenyl)-pyrrolidines and/or (m-alkanoyloxy-phenyl)-pyrrolidines by first cleavage of the ether linkage followed by acylation of the hydroxy group with an active acylating agent.

The compounds of the invention wherein R is lower alkyl, $R_2$ is lower alkyl, and $R_3$ is hydrogen can also be prepared by subjecting a 1-pyrrolinium compound of the formula,

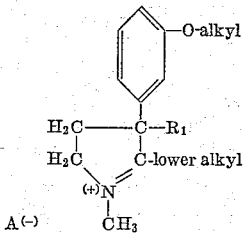

where $R_1$ has the same significance as defined earlier and $A^{(-)}$ is an anion, preferably an iodide ion, to reduction. The reduction can be conveniently carried out with various reducing agents such as gaseous hydrogen under pressure or complex metal hydrides. Reduction with a complex metal hydride is carried out by reacting the pyrrolinium compound with the hydride in an inert anhydrous solvent such as ether, tetrahydrofuran, dioxane, or the like, followed by decomposing the product with water or an acidic or basic aqueous medium. The use of lithium aluminum hydride is preferred. The concentration of lithium aluminum hydride can be varied considerably and for best results at least 1 and preferably 3 to 6 equivalents are employed. The temperature of the reaction is likewise subject to considerable variation. Conveniently, the reaction employing a hydride reductant is carried out in the temperature range from 0° C. to the boiling point of the solvent employed. As indicated, reduction in accordance with the invention can also be accomplished by means of gaseous hydrogen under elevated temperature and pressure in the presence of an unreactive organic solvent and a suitable hydrogenation catalyst. Preferably, a palladium on carbon catalyst is employed at pressures of about three atmospheres and a temperature of about 50° C. As solvents, methanol, ethanol, tetrahydrofuran, dioxane, and the like may be used.

The pyrrolinium compounds employed as starting materials in the above procedure can be prepared as follows: An α-(m-alkoxyphenyl)-α-alkylacetonitrile is treated with 1,2-dichloroethylene to produce the corresponding chloronitrile. The chloronitrile is treated with an alkyl magnesium halide to give a chromoimine which is cyclized to a pyrroline and the pyrroline methylated to give a 1-methyl-3-(m-alkoxyphenyl)-2,3-dialkyl-1-pyrrolinium salt. The pyrrolinium salt can be interconverted to other salts by using anion exchange methods.

Where starting materials for the processes of this invention can exist in asymmetric forms, the methods of preparation described above are applicable to racemic or to resolved, optically active forms. In those cases where optically active products are desired, they can be obtained either by using optically active starting materials or by resolution of a racemic final product. Resolution can be carried out by fractional crystallization of a salt formed with an optically active acid.

The following examples illustrate the invention.

Example 1

A solution of 46.5 g. N-methyl-α-(m-methoxyphenyl)-α-propylsuccinimide in 200 ml. dry ether is added dropwise with stirring to a suspension of 10.0 g. lithium aluminum hydride in 200 ml. dry ether. The mixture is refluxed with stirring for two hours, then cooled, treated cautiously with 30 ml. water, filtered, and concentrated to give 1-methyl-3-(m-methoxyphenyl)-3-propylpyrrolidine as an oil; B.P. 119–121°/1 mm. upon vacuum distillation. The free base can be converted to its hydrochloride by treating an ether solution of it with a solution of isopropanol that has been saturated with gaseous hydrogen chloride. The 1-methyl-3-(m-methoxyphenyl)-3-propyl-pyrrolidine hydrochloride which forms is collected and recrystallized from isopropanol-ether mixture; M.P. 133–135° C.

The water soluble hydrobromide is prepared by treating an ether solution of the free base with one equivalent of hydrogen bromide. Removal of the solvent leaves the hydrobromide salt.

The citrate salt can be prepared by mixing a solution of the free base in isopropyl alcohol with an isopropanol solution containing one equivalent citric acid and evaporating the isopropanol under reduced pressure.

N - Methyl-α-(m-methoxyphenyl)-α-propylsuccinimide is prepared as follows: A solution of 96.5 g. ethyl α-cyano-β-(m-methoxyphenyl)-β-propylacrylate in 150 ml. aqueous alcohol is treated with 30.3 g. potassium cyanide and the mixture warmed for 30 minutes on a steam bath. The mixture is then cooled, acidified to Congo red, and extracted with ether. The resulting crude ethyl α,β-dicyano-β-(m-methoxyphenyl)-hexanoate is treated with 500 ml. concentrated hydrochloric acid and refluxed for 80 hours, adding further small quantities of hydrochloric acid from time to time. Extraction of the suspension with ether and removal of the ether in vacuo leaves α-(m-methoxyphenyl)-α-propyl succinic acid as an oil. To 81.6 g. of the oily succinic acid is added 32.0 g. of an aqueous solution of 40% methylamine. The mixture is gradually heated to 190° C. and held at this temperature for one hour. The product is then distilled in vacuo to give N-methyl-α-(m-methoxyphenyl)-α-propylsuccinimide as a pale yellow oil, B.P. 167–174°/0.6 mm., $n_D^{20}$ 1.5475.

Example 2

A mixture of 21.4 g. 1-methyl-3-(m-methoxyphenyl)-3-propylpyrrolidine in 90 ml. constant boiling hydrobromic acid is refluxed for 90 minutes and then concentrated in vacuo to low bulk. Thin material is dissolved in 100 ml. water, made basic with sodium bicarbonate, and extracted exhaustively with ether. The ether extracts are combined, dried over sodium sulfate, filtered, and evaporated to dryness leaving an oily residue of 1-methyl-3-(m-hydroxy-phenyl)-3-propylpyrrolidine. This compound can be purified by distillation in vacuo or converted to its hydrochloride by treating an ether solution of it with ethereal hydrogen chloride to give 1-methyl-3-(m-hydroxyphenyl)-α-propylpyrrolidine hydrochloride as a white solid; M.P. 145–146° C. after recrystallization from isopropanol-ether mixture.

Example 3

A solution of 9.6 g. 1,2-dimethyl-3-(m-methoxyphenyl)-3-propylpyrrolidine in 30 ml. constant boiling hydrobromic acid is refluxed for two hours and the solution then concentrated to dryness. The residue is dissolved in water and the resulting aqueous solution is made basic with aqueous potassium carbonate and extracted with five 25 ml. portions of chloroform. Removal of the chloroform under reduced pressure gives 1,2-dimethyl-3-(m-hydroxyphenyl)-3-propylpyrrolidine which is then vacuum distilled.

Example 4

A solution of 9.6 g. 1,5-dimethyl-3-(methoxyphenyl)-3-propylpyrrolidine in 30 ml. constant boiling hydrobromic acid is refluxed for two hours and the solution then concentrated to dryness. The residue is dissolved in water and the resulting aqueous solution is made basic with aqueous potassium carbonate and extracted with five 25 ml. portions chloroform. Evaporation of the chloroform and distillation of the residue in vacuo yields 1,5-dimethyl-3-(m-hydroxyphenyl)-3-propylpyrrolidine; B.P. 147–150°/0.7 mm.

Example 5

To 8.1 g. 1-methyl-3-(m-hydroxyphenyl)-3-propylpyrrolidine is added 30 ml. acetic anhydride and 10 ml. pyridine. The mixture is heated at 90° C. for two hours, concentrated, and the residue distilled under reduced pressure to obtain 1-methyl-3-(m-acetoxyphenyl)-3-propylpyrrolidine; B.P. 136–138°/0.7 mm., $n_D^{20}$ 1.5228.

Conversion to the hydrochloride salt is accomplished by treating an ether solution of the free base with one equivalent of hydrogen chloride. Removal of the ether leaves the hydrochloride salt which can be recrystallized from isopropanol-ether mixture.

By using (+)-1-methyl-3-(m-hydroxyphenyl)-3-propylpyrrolidine or the corresponding levo (−) isomer in the above procedure, one obtains (+)-1-methyl-3-(m-acetoxyphenyl)-3-propylpyrrolidine (B.P. 138–9° C./1.1 mm.; $[\alpha]_D^{24}$ +18.4°) and the corresponding levo isomer (B.P. 129° C./0.6 mm.; $[\alpha]_D^{20}$ −19.2°), respectively.

Example 6

To 9.2 g. 1,2-dimethyl-3-(m-hydroxyphenyl)-3-propylpyrrolidine is added 30 ml. of propionic anhydride and 10 ml. pyridine. This mixture is heated at 90° C. for two hours, concentrated, and the residue distilled under reduced pressure to obtain the desired 1,2-dimethyl-3-(m-propionyloxyphenyl)-3-propylpyrrolidine.

Example 7

To 9.2 g. 1,5-dimethyl-3-(m-hydroxyphenyl)-3-propylpyrrolidine is added 30 ml. acetic anhydride and 10 ml. pyridine. This mixture is heated at 90° C. for two hours, concentrated, and the residue distilled under reduced pressure to obtain 1,5-dimethyl-3-(m-acetoxyphenyl)-3-propylpyrrolidine; B.P. 132°/0.9 mm., $n_D^{20}$ 1.5104.

Example 8

To 4.3 g. 5-methyl-3-(m-methoxyphenyl)-3-propylpyrrolidine is added 5 ml. formic acid followed by 5 ml. 40% aqueous formaldehyde. The resulting mixture is maintained at 95° C. for six hours, poured into 50 ml. water, made basic with aqueous potassium carbonate, extracted with three 50 ml. portions ether, the extracts combined, and the solvent removed under reduced pressure to give 1,5 - dimethyl-3-(m-methoxyphenyl)-3-propylpyrrolidine; B.P. 114–118°/0.4 mm. upon vacuum distillation, $n_D^{20}$ 1.5156.

5 - methyl - 3 - (m-methoxyphenyl)-3-propylpyrrolidine is prepared as follows: To a suspension of 29.0 g. sodium amide in 350 ml. dry ether is added, dropwise with stirring, 140.0 g. α-(m-methoxyphenyl)-valeronitrile. The red solution is then refluxed for three hours under a stream of nitrogen, cooled, and treated with 50.0 g. 1,2-propylene oxide, followed by an additional three hours of refluxing. The solution is cooled, 100 ml. water is added, and the ether layer separated and washed with three 100 ml. portions of water. Removal of the ether and distillation under reduced pressure gives 4-cyano-4-(m-methoxyphenyl)-heptanol-2; B.P. 143–147°/0.7 mm., $n_D^{20}$ 1.5280.

To a suspension of 23.0 g. lithium aluminum hydride in 500 ml. dry ether is added dropwise 100.0 g. 4-cyano-4-(m - methoxyphenyl) - heptanol - 2. The solution is refluxed for four hours, cooled, and treated with 15 ml. water, 15 ml. 4 N caustic soda, and finally an additional 45 ml. water. This solution is then refluxed for one hour, filtered, concentrated, and distilled under reduced pressure to give the hydroxyamine, 4-aminoethyl-4-(m-methoxyphenyl)-heptanol-2; B.P. 153–158°/0.7 mm., $n_D^{20}$ 1.5310.

A solution of 70.0 g. hydroxyamine in 250 ml. chloroform is saturated with gaseous hydrogen chloride, cooled to 0° C., and treated with 66.0 g. thionyl chloride. The temperature of the mixture is allowed to rise slowly to room temperature and the mixture is then refluxed for three hours, concentrated in vacuo to a tar, and this tar treated with 200 ml. water. The suspension is made strongly basic with sodium carbonate, then held at 95° C. for two hours, cooled, and extracted with three 100 ml. portions ether. The ether is removed and the product distilled under reduced pressure to obtain 5-methyl-3-(m-methoxyphenyl)-3-propylpyrrolidine as a colorless oil; B.P. 123–126°/0.4 mm., $n_D^{20}$ 1.5310.

Example 9

To 4.8 g. 3-(m-methoxyphenyl)-3-propylpyrrolidine is added 5 ml. formic acid followed by 5 ml. 40% aqueous formaldehyde. The mixture is kept at 90° C. for six hours, poured into 50 ml. water, made basic with aqueous potassium carbonate, extracted with three 50 ml. portions ether and the extracts concentrated to give 1-methyl-3-(m-methoxyphenyl)-3-propylpyrrolidine as an oil; B.P. 119–121°/1 mm. upon vacuum distillation.

3-(m-methoxyphenyl)-3-propylpyrrolidine can be prepared as follows: To 81.6 g. α-(m-methoxyphenyl)-α-propyl succinic acid is added 44.5 g. benzylamine and the mixture gradually heated to 190° C. and held at that temperature for one hour. The product is then distilled in vacuo to give N-benzyl-α-(m-methoxyphenyl)-α-propylsuccinimide as an oil. A solution of 50.2 g. N-benzyl-α-(m-methoxyphenyl)-α-propylsuccinimide in 200 ml. dry ether is added dropwise with stirring to a suspension of 10.0 g. lithium aluminum hydride in 200 ml. dry ether. The mixture is refluxed and stirred for two hours, then cooled and treated cautiously with 30 ml. water, filtered, concentrated, and distilled to give 1-benzyl-3-(m-methoxyphenyl)-3-propylpyrrolidine; B.P. 182–186°/0.7 mm., $n_D^{20}$ 1.5604. When 15.0 g. 1-benzyl-3-(m-methoxyphenyl)-3-propylpyrrolidine in 200 ml. ethanol is subjected to hydrogenation under one atmosphere of hydrogen in the presence of a 5% palladium on charcoal catalyst until one equivalent of hydrogen is absorbed, hydrogenolysis of the benzyl group occurs. The catalyst is removed by filtration, the solvent evaporated from the filtrate, and the residue distilled in vacuo to give 3-(m-methoxyphenyl)-3-propylpyrrolidine; B.P. 125–129°/0.8 mm., $n_D^{20}$ 1.5388.

Example 10

To 9.8 g. 3-(m-methoxyphenyl)-3-propylpyrrolidine in 50 ml. dimethylformamide is added 12.0 g. potassium carbonate followed by 4.3 g. methyl iodide. The resulting mixture is stirred and gently warmed for five hours, cooled, poured into water, and the resulting solution extracted three times with ether. The ether extracts are combined and the solvent is removed, leaving as the product 1-methyl-3-(m-methoxyphenyl)-3-propylpyrrolidine; B.P. 119–121°/1 mm. upon vacuum distillation.

3-(m-methoxyphenyl)-3-propylpyrrolidine is prepared as follows: A solution of 20.0 g. 2-(2'-chloroethyl)-2-(m-methoxyphenyl)-valeronitrile in 100 ml. dry ether is added dropwise with stirring to a suspension of 5.0 g. lithium aluminum hydride in 100 ml. dry ether. The mixture is refluxed for two hours, then cooled and treated with 30 ml. water, filtered, concentrated, and distilled to give 3-(m-methoxyphenyl)-3-propylpyrrolidine; B.P. 125–129°/0.8 mm., $n_D^{20}$ 1.5388.

Dimethyl sulfate may also be used as the alkylating agent instead of methyl iodide. The same product, namely, 1-methyl-3-(m-methoxyphenyl)-3-propylpyrrolidine, is thereby obtained.

Example 11

To a stirred suspension of 1.0 g. lithium aluminum hydride in 25 ml. dibutyl ether is added dropwise a slurry of 5.0 g. 1,2-dimethyl-3-(m-methoxyphenyl)-3-propyl-1-pyrrolinium iodide in 125 ml. dibutyl ether. The mixture is refluxed for one hour, cooled and treated with 3 ml. water to decompose the excess lithium aluminum hydride. The mixture is then filtered and concentrated to give 1,2-dimethyl-3-(m-methoxyphenyl)-3-propylpyrrolidine as an oil; B.P. 142–144°/1.3 mm. upon vacuum distillation, $n_D^{20}$ 1.5224.

Conversion to the hydrochloride salt is accomplished by treating an ether solution of the free base with one equivalent of hydrogen chloride. Removal of the solvent leaves the hydrochloride salt.

1,2-dimethyl-3-(m-methoxyphenyl)-3-propyl-1-pyrrolinium iodide is prepared as follows: To a suspension of 155.0 g. sodium amide in 3 liters benzene with temperature below 5° C. is added slowly 582.0 g. m-methoxybenzylcyanide. The resulting deep red solution is stirred for two hours at this temperature and then 525.0 g. propyl bromide is added, again maintaining the temperature below 5° C. Once addition is complete the temperature is allowed to rise slowly to room temperature and the solution is gradually warmed, culminating with reflux for three hours during which time the red color fades slowly. The mixture is cooled, treated with 1 liter water, and then neutralized with 2 N sulfuric acid. The aqueous layer is separated and the benzene solution washed with two 500 ml. portions water, concentrated, and distilled under reduced pressure to give α-(m-methoxyphenyl)-valeronitrile as a colorless oil; B.P. 112–120°/0.4 mm., $n_D^{20}$ 1.5150.

To a stirred suspension of 71.0 g. sodium amide in 2 liters benzene maintained below 10° C. is added, with stirring, 330.0 g. α-(m-methoxyphenyl)-valeronitrile. The resulting deep red mixture is refluxed for two hours, cooled to 5° C. and, maintaining this temperature with efficient cooling treated with 350.0 g. ethylene dichloride over a 20 minute period. The resulting mixture is stirred at this temperature for two hours, gradually allowed to come to room temperature, and then refluxed with stirring for six hours, during which time the color changes to an orange red. The mixture is cooled, treated with 500 ml. water, and neutralized with 2 N sulfuric acid. The aqueous layer is separated and the benzene layer washed with two 500 ml. portions water, concentrated, and fractionally distilled under reduced pressure to give 3-cyano-3-(m-methoxyphenyl)-1-chlorohexane as a colorless oil; B.P. 133–135°/0.5 mm., $n_D^{20}$ 1.5221.

A solution of methyl magnesium bromide (prepared from 20.0 g. magnesium and 80.0 g. methyl bromide) in 200 ml. dibutyl ether is freed from excess methyl bromide by partial distillation and treated at room temperature with 52.5 g. 3-cyano-3-(m-methoxyphenyl)-1-chlorohexane in 200 ml. dibutyl ether. The resulting mixture is heated at 120° C. for three hours, cooled, treated with a saturated solution of ammonium chloride, and stirred for ten minutes. Thereafter the solution separates into two layers. The layers are separated, the aqueous layer washed with chloroform, and the organic layers combined and concentrated in vacuo to an oil. The resulting oil is extracted with four 100 ml. portions 2 N ice cold hydrochloric acid, the extracts basified and extracted with ether to give crude 2-methyl-3-(m-methoxyphenyl)-3-propyl-1-pyrroline.

To 10.0 g. 2-methyl-3-(m-methoxyphenyl)-3-propyl-1-pyrroline in 50 ml. dimethylformamide is added 4.5 g. methyl iodide. The resulting mixture is stirred and warmed for five hours, cooled, and the resulting solution evaporated to dryness. Trituration of the residue with ether leaves 1,2-dimethyl-3-(m-methoxyphenyl)-3-propylpyrrolinium iodide as a solid product; M.P. 147–148° C. after recrystallization from chloroform-ether mixture.

If desired, the 2-methyl-3-(m-methoxyphenyl)-3-propyl-1-pyrroline can be reduced to 2-methyl-3-(m-methoxyphenyl)-3-propylpyrrolidine, B.P. 129°/0.6 mm., $n_D^{20}$ 1.5330 according to procedure described in paragraph 1 of this example. This compound can then be methylated as previously described in Examples 9 and 10 to give 1,2-dimethyl-3-(m-methoxyphenyl)-3-propylpyrrolidine.

Example 12

5.0 g. of unresolved 1-methyl-3-(m-methoxyphenyl)-3-propylpyrrolidine dissolved in 70 ml. hot isopropanol is mixed with a solution of 9.0 g. (—)di-p-toluoyl-L(+)tartaric acid in 70 ml. hot isopropanol. On cooling, one obtains the (—)di-p-toluoyl-L(+)tartrate salt of (—)1-methyl-3-(m-methoxyphenyl)-3-propylpyrrolidine; M.P. 134° C. after two recrystallizations from isopropanol; $[\alpha]_D^{21.5}$ —90°. A solution of 5.35 g. of this optically active tartrate salt is made basic with aqueous sodium hydroxide and the solution extracted with four 25 ml. portions of ether. The combined ether extract is dried, the ether distilled and the residue distilled under reduced pressure to obtain the desired (—)-1-methyl-3-(m-methoxyphenyl)-3-propylpyrrolidine; B.P. 120°/1 mm., $[\alpha]_D^{21.5}$ —19.8°.

The isopropanol mother liquors from which the tartrate salt of the levo isomer has been separated are evaporated to dryness, the residue taken up in water, and the solution made basic with aqueous sodium hydroxide. The solution is extracted with ether, the ether extract evaporated to remove the ether and the residual oil dissolved in isopropanol. (+)Di-p-toluoyl-D(—)tartaric acid in isopropanol is added and the (+)di-p-toluoyl-D(—)tartrate salt of (+)1-methyl-3-(m-methoxyphenyl)-3-propylpyrrolidine collected and purified by recrystallization from isopropanol; M.P. 134° C.; $[\alpha]_D^{26}$ +89.7°. Conversion to the free base, as described above for the levo isomer, gives (+)1-methyl-3-(m-methoxyphenyl)-3-propylpyrrolidine; B.P. 120°/0.9 mm.; $[\alpha]_D^{26}$ +16.5°.

Example 13

11 g. of (—)-1-methyl-3-(m-methoxyphenyl)-3-propylpyrrolidine is added to 50 ml. of constant boiling hydrobromic acid and the mixture heated under reflux for 1½ hours. Most of the hydrobromic acid is distilled from the reaction mixture in vacuo and the residue dissolved in about 60 ml. of water. The solution is made basic with sodium bicarbonate, extracted with several portions of ether, and the combined ether extracts dried over sodium sulfate. The ether is distilled from the combined extract and the residue distilled in vacuo to obtain the desired (—)-1-methyl-3-(m-hydroxyphenyl)-3-propylpyrrolidine.

8 g. of (—)-1-methyl-3-(m-hydroxyphenyl)-3-propylpyrrolidine is dissolved in anhydrous ether and the resulting solution treated with an excess of hydrogen chloride dissolved in isopropanol. The (—)-1-methyl-3-(m-hydroxyphenyl)-3-propylpyrrolidine hydrochloride which separates is collected and recrystallized from isopropanol-ether mixture; M.P. 145–7° C.; $[\alpha]_D^{25}$ —11.3° (C.=0.85 in ethanol).

By using (+)-1-methyl-3-(m-methoxyphenyl)-3-propylpyrrolidine in the above procedure, one obtains (+)-1-methyl-3-(m-hydroxyphenyl)-3-propylpyrrolidine and (+)-1-methyl-3-(m-hydroxyphenyl)-3-propylpyrrolidine hydrochloride. The hydrochloride salt melts at 142–5° C.; $[\alpha]_D^{25}$ +14.8° (C.=0.9 in ethanol).

This application is a continuation in part of my application Serial Number 163,030, filed December 29, 1961, and now abandoned.

I claim:
1. A member of the class consisting of compounds of the formula,

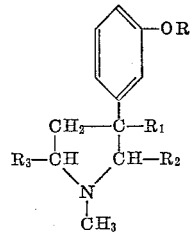

and pharmaceutically acceptable acid-addition salts thereof; where R is a member of the class consisting of hydrogen, lower alkyl and lower alkanoyl, $R_1$ is alkyl containing from 2 to 4 carbon atoms inclusive, and $R_2$ and $R_3$ are each members of the class consisting of hydrogen and alkyl containing 1 to 2 carbon atoms, at least one of said $R_2$ and $R_3$ being hydrogen.

2. A pharmaceutically acceptable acid-addition salt of a compound having the formula,

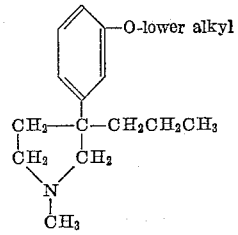

3. A pharmaceutically acceptable acid-addition salt of 1-methyl-3-(m-methoxyphenyl)-3-propylpyrrolidine.

4. 1-methyl-3-(m-methoxyphenyl)-3-propylpyrrolidine hydrochloride.

5. (—)-1-methyl-3-(m-methoxyphenyl)-3-propylpyrrolidine hydrochloride.

6. 1-methyl-3-(m-methoxyphenyl)-3-propylpyrrolidine.

7. A pharmaceutically acceptable acid-addition salt of 1-methyl-3-(m-hydroxyphenyl)-3-propylpyrrolidine.

8. 1-methyl-3-(m-hydroxyphenyl)-3-propylpyrrolidine hydrochloride.

9. (—)-1-methyl-3-(m-hydroxyphenyl)-3-propylpyrrolidine hydrochloride.

10. (+)-1-methyl-3-(m-hydroxyphenyl)-3-propylpyrrolidine.

11. 1-methyl-3-(m-hydroxyphenyl)-3-propylpyrrolidine.

12. A pharmaceutically acceptable acid-addition salt of 1-methyl-3-(m-acetoxyphenyl)-3-propylpyrrolidine.

13. 1-methyl-3-(m-acetoxyphenyl)-3-propylpyrrolidine hydrochloride.

14. 1-methyl-3-(m-acetoxyphenyl)-3-propylpyrrolidine.

References Cited in the file of this patent
UNITED STATES PATENTS

| | | |
|---|---|---|
| 2,878,264 | Lunsford | Mar. 17, 1959 |
| 2,975,193 | Dice et al. | Mar. 14, 1961 |

FOREIGN PATENTS

| | | |
|---|---|---|
| 570,359 | Belgium | Feb. 14, 1959 |

OTHER REFERENCES

Woods et al.: J. Org. Chem., vol. 19, pages 1290–5 (1954).